UNITED STATES PATENT OFFICE.

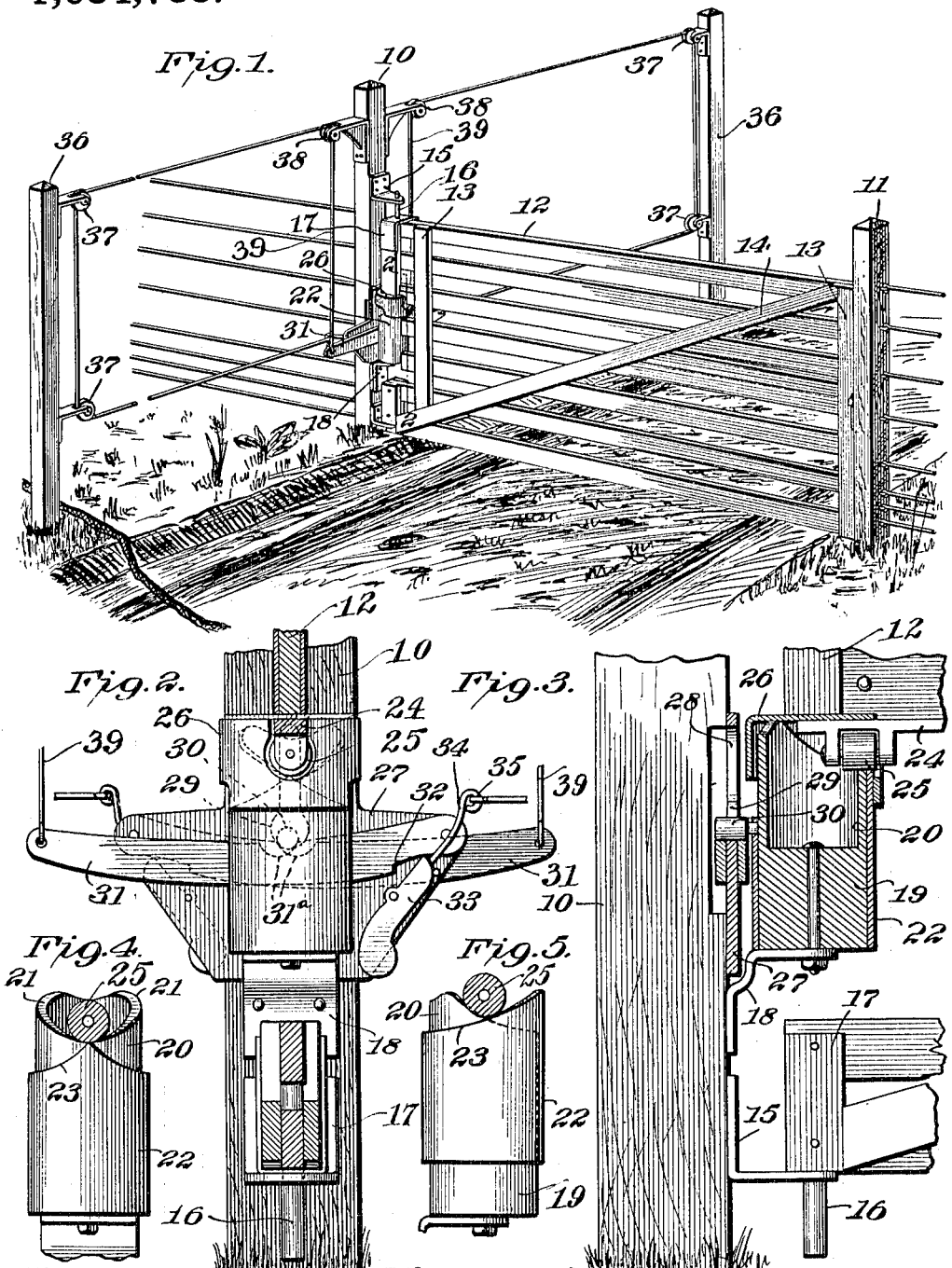

WILLIAM F. DONNELL, OF HEMATITE, MISSOURI, ASSIGNOR OF ONE-FOURTH TO JOHN F. MEIER, OF PEVELY, MISSOURI, AND ONE-FOURTH TO WELCOME F. SWEET, OF ST. LOUIS, MISSOURI.

FARM-GATE.

1,084,733.  Specification of Letters Patent.  Patented Jan. 20, 1914.

Application filed February 17, 1913. Serial No. 748,914.

*To all whom it may concern:*

Be it known that I, WILLIAM F. DONNELL, a citizen of the United States, residing at Hematite, Jefferson county, Missouri, have invented a certain new and useful Improvement in Farm-Gates, of which the following is a full, clear, and exact description, such as will enable others skilled in the art to which it appertains to make and use the same, reference being had to the accompanying drawings, forming part of this specification, in which—

Figure 1 is a perspective view of a farm gate of my improved construction. Fig. 2 is an enlarged vertical section taken approximately on the line 2—2 of Fig. 1, and showing the mechanism utilized for effecting the opening and closing movements of the gate. Fig. 3 is a side elevational view of the parts seen in Fig. 2, and with the gate operating mechanism in vertical section. Fig. 4 is a front elevational view of parts of the operating mechanism, said parts being in normal position. Fig. 5 is a side elevational view of the parts seen in Fig. 4 and with one of said parts in the position it assumes when the gate is open.

My invention relates to new and useful improvements in farm gates of the type that are swung into open or closed position by gravity, and the mechanism for effecting the proper gravity movement of the gate being operated by means of cables which extend from the gate post a suitable distance in both directions away from said gate alongside the road-way across which the gate is normally positioned.

The principal object of my invention is to provide a simple, inexpensive gate which can be easily and quickly operated by a person in a vehicle approaching the gate, and the operating mechanism for controlling the gravity movement of said gate being arranged so that the gate swings away from the operator in both its opening and closing movements.

Further objects of my invention are, to provide means whereby the gate may be opened by a person approaching the gate from either side, and further, to provide simple means for locking parts of the actuating mechanism when the same are shifted to bring about an opening movement of the gate, thereby practically locking the gate in its open position until the locking devices are released by the actuation of certain means after the operator has passed the open gate.

To the above purposes my invention consists in certain novel features of construction and arrangement of parts hereinafter more fully described and claimed.

Referring by numerals to the accompanying drawings, 10 designates the post to which the gate is hinged, 11 the post against which the free end of the gate swings and 12 the gate, the same comprising a series of horizontally disposed bars, to the ends of which are framed vertically disposed members 13. The gate is preferably reinforced by a diagonally disposed bar 14.

Fixed to the post 10 is a pair of brackets 15, and arranged to rotate and move vertically therethrough are pins 16, which latter are carried by suitable brackets 17 fixed on the upper and lower corners of the gate at the rear of one end thereof. While the gate is in its normal or closed position the lower one of the brackets 17 rests upon the lowermost one of the brackets 15, and the uppermost brackets 17 occupy a position slightly below the uppermost one of the brackets 15, which arrangement is necessary to permit the gate to rise during its opening movement.

Fixed to the post 10 above the lowermost one of the brackets 15 is a bracket 18 to which is fixed a cylindrical block 19, and formed integral with the upper end of this block is a cylindrical wall or flange 20. The upper edge of this wall or flange 20 is gradually inclined upwardly in both directions, as designated by 21, away from a central point, which point is in direct alinement with the posts 10 and 11. Arranged to slide freely upon the cylindrical block 19 and the wall or web 20 is a sleeve 22, the upper edge of which is inclined downwardly in both directions, as designated by 23, away from a central point, which latter is in direct alinement with the posts 10 and 11, and when the parts are normally positioned and the gate is closed the point between the inclined upper edges 23 occupies a position coincident with the point between the inclined edges 21 of the wall or flange 20. (See Fig. 4).

Fixed to the end of the gate 12 immediately above the parts just described is a bracket 24 in which is journaled a roller 25, the same normally bearing on top of the wall or flange 20 at the lowermost point between the inclined upper edges 21 thereof. Fixed to the end of the gate immediately above this roller and bracket is a cap 26 which fits loosely over the upper ends of the sleeve 22 and the wall or flange 20, said cap being for the purpose of preventing water, snow and dust from entering the space within the wall or flange 20.

Fixed to the post 10 immediately above the bracket 18 and to the rear of the block 19 is a plate 27, in the upper portion of which is formed a vertically disposed slot 28, the lower end of which is widened, as designated by 29. Fixed to the rear side of the sleeve 22 is a roller 30 which normally occupies the widened lower end 29 of the slot 28.

Pivotally mounted on opposite sides of the plate 27 is a pair of oppositely arranged levers 31 which pass directly beneath the roller 30. Formed in the upper edge of each lever 31 is a notch 31ª having an inclined edge disposed so that when the outer end of the lever is elevated the inclined edge of the notch in said lever will bear against the roller 30, thereby forcing the same to the side of the widened portion 29 of the slot 28, which action partially rotates the sleeve 22, thereby moving the high point between the inclined upper edges 23 off center with respect to the roller 25. Formed in the undersides of these levers near their points of pivotal connection with the plate 27 are notches 32, and adapted to engage therein are the upper ends of gravity pawls 33, the same being pivoted on opposite sides of the plate 27 below the levers 31. Projecting upwardly from the upper ends of the pawls 33 are arms 34 provided with loops 35 at their upper ends.

Located to the side of the road-way across which the gate is normally positioned and at suitable distances away from the gate post 10 are posts 36 each provided with a pair of brackets carrying grooved pulleys 37. Fixed to the upper end of the post 10 and on opposite sides thereof are brackets provided with grooved pulleys 38. Attached to the outer ends of the levers 31 are the ends of cables 39 which extend upward over the grooved pulleys 38, from thence outward over the uppermost grooved pulleys 37, thence downward around the lowermost grooved pulleys 37, and from thence said cables extend toward the post 10 and their ends are attached to the loops 35 on the upper ends of the arms 34.

Normally the gate occupies the position seen in Fig. 1 with its free outer end bearing against the post 11, and when so positioned the roller 25 occupies a central point between the inclined upper edges 21 of the wall or flange 20.

A person approaching the gate from either direction desiring to open said gate manually engages the vertically disposed portion of the cable between the grooved pulleys 37 and pulls downward upon said cable. As a result of this operation the outer end of the corresponding lever 31 is pulled upward and the initial movement of said lever causes the inclined upper edge of the notch 31ª of said lever to bear against the roller 30, thereby moving said roller slightly to one side and partially rotating the sleeve 22 upon the block 19, thereby shifting the high point between the inclined edges 23 off center with respect to the roller 25.

The continued pull of the cable upon the lever just actuated raises the free end of said lever, and the upper edge thereof bearing against the roller 30 moves the same upward through the slot 28, and consequently, moving the sleeve 22 upward on the block 19 and wall or flange 20, and as the inclined surfaces on the upper edge of said sleeve passes above the inclined surfaces 21 on the upper edge of the wall or flange 20, the roller 25 will start and travel downward over the corresponding inclined surface 23, which movement is brought about by the weight or gravity of the gate.

The movement just described elevates the sleeve 22 to the position seen in Fig. 5, and the roller 25 moves downward upon the corresponding inclined surface 23 as the gate swings open by reason of its own weight or gravity.

By the arrangement of the inclined portions of the notches 31ª, the high point between the inclined surface 23 on the sleeve 22 is shifted so as to bring about an opening movement of the gate away from the operator. When the lever 31 has been shifted to its limit of movement the point of the corresponding gravity pawl 33 will move into the notch 32 of the shifted lever, thereby locking the same in its shifted position, and as said lever is locked in its elevated position, the roller 25 will be held against reverse movement, and as a result, the gate will be locked in its open position.

After passing through the opening normally closed by the gate, the operator manually engages the vertical portion of the cable between the pulleys 37 and pulls upward on said cable, thereby pulling the upper end of the gravity pawl out of the notch in which it has been seated, and the weight of the gate transmitted to the lever 31 which was previously elevated, will cause said lever to swing downward to its normal position, thereby moving the sleeve 22 downward, and the roller 25 will now travel downward upon the corresponding inclined upper edge 21 of the wall or flange 20, and during this movement, the gate swings to its closed position. Thus, the gate is swung into open position by elevating the sleeve 22 to cause the roller 25 to travel by gravity down one of the inclined surfaces 23, and likewise the gate closes by gravity, during which closing movement the roller travels down one of the inclined surfaces 21, and when the gate is closed, the roller 25 occupies the notch or low point between the two inclined surfaces 21.

A gate of my improved construction is comparatively simple, can be easily and cheaply installed, can be opened and closed by an operator seated in a vehicle, and the gravity of the gate itself is utilized for effecting its opening and closing movements.

It will be readily understood that minor changes in the size, form and construction of the various parts of my improved farm gate can be made and substituted for those herein shown and described without departing from the spirit of my invention, the scope of which is set forth in the appended claims.

I claim:

1. The combination with a gate and post to which the gate is hinged, of a pair of members each provided with a pair of oppositely disposed inclined surfaces, one of which members is arranged to move vertically with respect to the other member, a roller carried by the gate and adapted to bear on the inclined surfaces of the members, means for actuating the movable member, and means for locking the actuating means in its shifted position.

2. The combination with a gate and post to which said gate is hinged, of a fixed member having a pair of oppositely inclined surfaces, a sliding member having a pair of oppositely disposed inclined surfaces, a roller carried by the gate and adapted to bear on the inclined surfaces of the fixed and sliding members, and means for imparting slight rotary movement to the sliding member and then moving the same vertically with respect to the fixed member.

3. The combination with a gate and post to which said gate is hinged, of a fixed member having a pair of oppositely disposed inclined surfaces, a sliding member having a pair of oppositely disposed inclined surfaces, a roller carried by the gate and bearing upon the inclined surfaces of said members, a pair of levers for imparting movement to the sliding member, cables connected to said levers and extending in opposite directions away from the gate post, and gravity latches for said levers, which latches are connected to the cables.

4. The combination with a gate and post to which said gate is hinged, of a cylinder fixed to the post and having on its upper edge a pair of oppositely disposed inclined surfaces, a sleeve mounted for sliding movement on the cylinder, the upper edge of which sleeve is provided with a pair of oppositely disposed inclined surfaces, a roller carried by the gate and adapted to bear on the inclined surfaces of the sleeve and cylinder, and means operable from points on opposite sides of the gate post for imparting vertical movement to the sleeve to elevate the roller and gate in effecting an opening movement of the latter.

In testimony whereof I hereunto affix my signature in the presence of two witnesses, this 13th day of February, 1913.

WILLIAM F. DONNELL.

Witnesses:
M. P. SMITH,
M. A. HANDEL.

---

Copies of this patent may be obtained for five cents each, by addressing the "Commissioner of Patents, Washington, D. C."